(12) United States Patent
Hashimoto et al.

(10) Patent No.: US 9,072,146 B2
(45) Date of Patent: Jun. 30, 2015

(54) LIGHT-EMITTING ELECTRIC-POWER GENERATION MODULE AND LIGHT-EMITTING ELECTRIC-POWER GENERATION DEVICE

(71) Applicant: Kabushiki Kaisha Toshiba, Tokyo (JP)

(72) Inventors: Rei Hashimoto, Tokyo (JP); Jongil Hwang, Kanagawa (JP); Shinji Saito, Kanagawa (JP); Shinya Nunoue, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 125 days.

(21) Appl. No.: 13/854,381

(22) Filed: Apr. 1, 2013

(65) Prior Publication Data

US 2014/0111095 A1 Apr. 24, 2014

(30) Foreign Application Priority Data

Oct. 22, 2012 (JP) ................................. 2012-232724

(51) Int. Cl.
*H05B 37/02* (2006.01)
*H05B 33/08* (2006.01)

(52) U.S. Cl.
CPC ............. *H05B 33/0845* (2013.01); *Y02E 10/52* (2013.01)

(58) Field of Classification Search
CPC ......... Y02E 10/40; Y02E 10/50; Y02E 10/56; Y02E 10/566

USPC ............................ 315/149–150; 136/243–265
See application file for complete search history.

(56) References Cited

U.S. PATENT DOCUMENTS

| 2006/0133073 | A1* | 6/2006 | Nakata et al. | 362/192 |
| 2008/0211451 | A1* | 9/2008 | Zhang et al. | 320/101 |
| 2009/0168410 | A1* | 7/2009 | Tanamura et al. | 362/183 |
| 2010/0033125 | A1* | 2/2010 | Yamada | 320/101 |
| 2012/0091473 | A1* | 4/2012 | Lee et al. | 257/81 |
| 2012/0274221 | A1* | 11/2012 | Chen | 315/155 |
| 2013/0000690 | A1* | 1/2013 | Liu | 136/244 |

FOREIGN PATENT DOCUMENTS

JP 2002-296590 10/2002

* cited by examiner

*Primary Examiner* — Jason M Crawford
(74) *Attorney, Agent, or Firm* — Oblon, McClelland, Maier & Neustadt, L.L.P.

(57) ABSTRACT

A light-emitting electric-power generation module according to an embodiment includes a photoelectric conversion element for emitting light and generating electric power, a light-emission controller configured to control light emission of the photoelectric conversion element, an electric-power generation controller configured to control electric-power generation of the photoelectric conversion element, and a switching unit configured to switch light-emission state and electric-power generation state of the photoelectric conversion element.

20 Claims, 8 Drawing Sheets

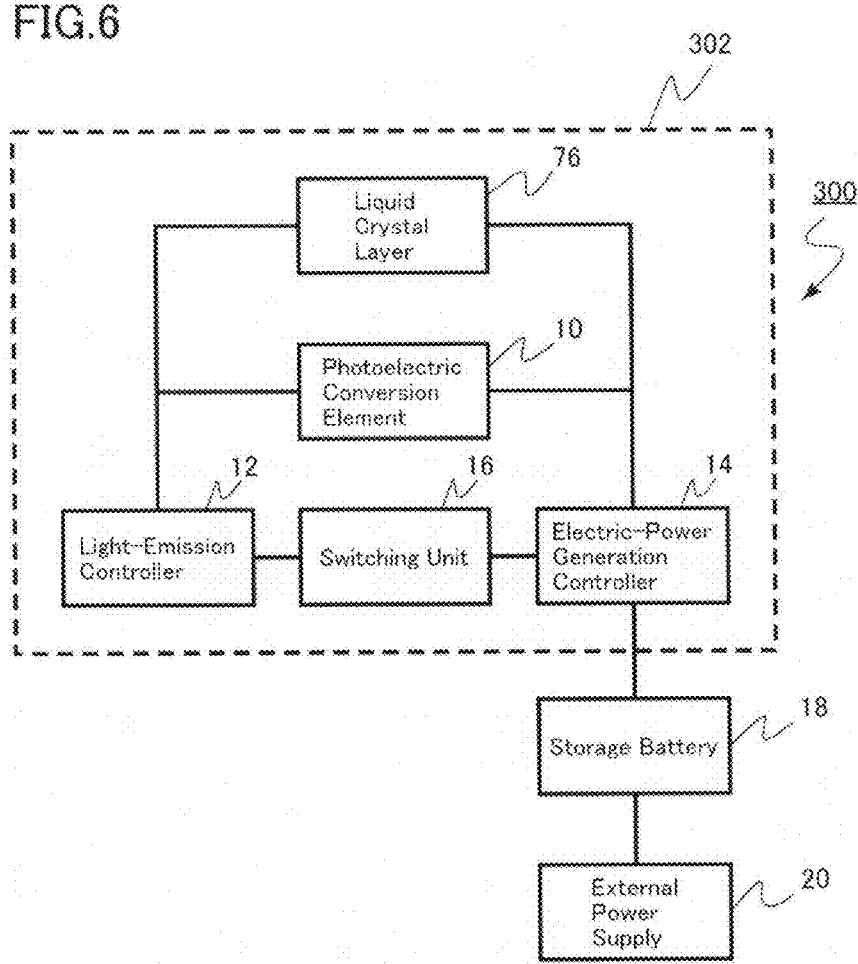

LIGHT-EMITTING ELECTRIC-POWER GENERATION MODULE AND LIGHT-EMITTING ELECTRIC-POWER GENERATION DEVICE

CROSS-REFERENCE TO RELATED APPLICATION

This application is based upon and claims the benefit of priority from Japanese Patent Application No. 2012-232724, filed on Oct. 22, 2012, the entire contents of which are incorporated herein by reference.

FIELD

Embodiments described herein relate generally to a light-emitting electric-power generation module and a light-emitting electric-power generation device.

BACKGROUND

It is an important issue for the entire society to reduce the electric power consumption of electronic devices, illumination devices, and the like and to promote the usage of renewable energy. In order to reduce the electric power consumption, for example, a display of an electronic device and an illumination device use photoelectric conversion elements consuming less electric power such as a light-emitting diode (LED).

On the other hand, in particular, portable devices such as a smartphone and a tablet terminal do not necessarily have sufficient battery capacity for their electric power consumptions, and this results in frequent battery charge, which makes it difficult for everyday use. For this reason, there is an attempt to additionally provide a solar battery to the portable device. By using the solar battery, use of renewable energy in the portable device is promoted.

BRIEF DESCRIPTION OF THE DRAWINGS

FIG. 6 is a block diagram illustrating a light-emitting electric-power generation device according to a third embodiment;

DETAILED DESCRIPTION

Figure 1:
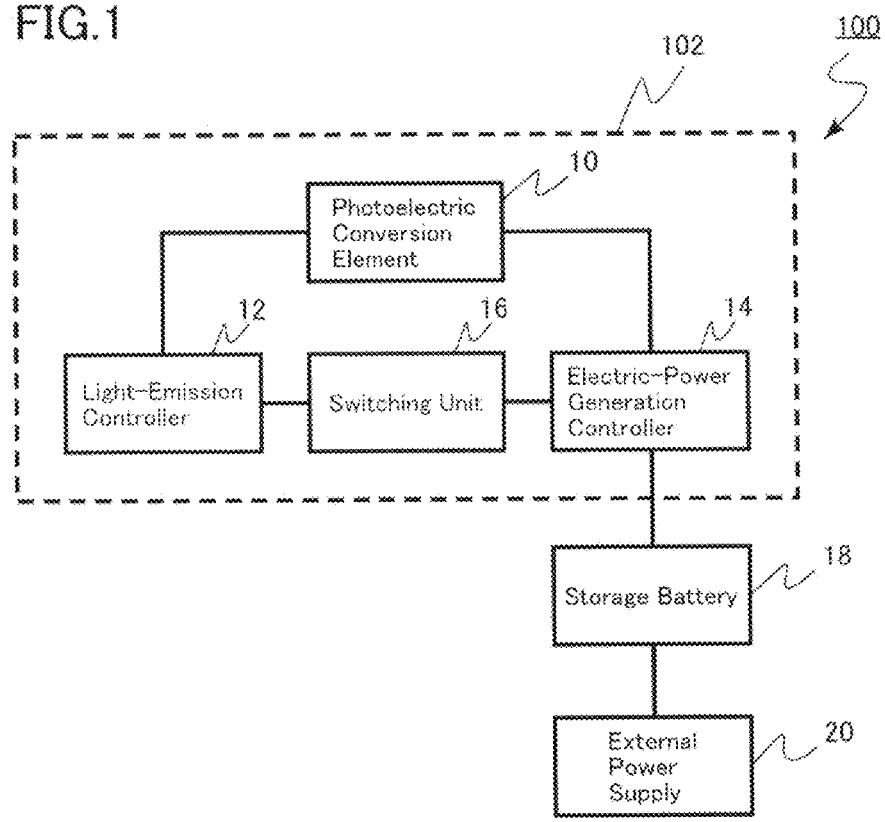
FIG. 1 is a block diagram illustrating a light-emitting electric-power generation device according to a first embodiment.

A light-emitting electric-power generation module according to an embodiment includes a photoelectric conversion element for emitting light and generating electric power, a light-emission controller configured to control light emission of the photoelectric conversion element, an electric-power generation controller configured to control electric-power generation of the photoelectric conversion element, and a switching unit configured to switch light-emission state and electric-power generation state of the photoelectric conversion element.

In this specification, the "photoelectric conversion element" generally means elements capable of converting electric energy into light energy and converting light energy into electric energy. For example, it is a light-emitting diode (LED), a semiconductor laser (LD), an organic light-emitting diode (OLED), a solar battery, and the like.

The embodiments will be hereinafter explained with reference to drawings. In the drawings, the same or similar portions are denoted with the same or similar reference numerals.

(First Embodiment)

A light-emitting electric-power generation device according to the present embodiment includes a photoelectric conversion element for emitting light and generating electric power, a light-emission controller configured to control light emission of the photoelectric conversion element, an electric-power generation controller configured to control electric-power generation of the photoelectric conversion element, and a switching unit configured to switch light-emission state and electric-power generation state of the photoelectric conversion element. In addition, a casing for protecting the photoelectric conversion element, the light-emission controller, the electric-power generation controller, and the switching unit is provided. A light-emitting electric-power generation module is constituted by the photoelectric conversion element, the light-emission controller, the electric-power generation controller, and the switching unit.

In the light-emitting electric-power generation device according to the present embodiment, the same photoelectric conversion element performs not only the function of light emission but also the function of electric-power generation. More specifically, the same element is used as not only the light-emitting element but also the electric-power generation element. Therefore, an energy-saving-type light-emitting electric-power generation device using renewable energy can be provided.

The light-emitting electric-power generation device according to the present embodiment is, for example, a spot-light-type outdoor illumination device. Hereinafter, an outdoor illumination device will be explained as an example.

FIG. 1 is a block diagram illustrating a light-emitting electric-power generation device according to the present embodiment. The light-emitting electric-power generation device 100 includes a light-emitting electric-power generation module 102.

The light-emitting electric-power generation module 102 includes a photoelectric conversion element 10, a light-emission controller 12, an electric-power generation controller 14, and a switching unit 16. The light-emitting electric-power generation device 100 includes a storage battery 18. Further, the light-emitting electric-power generation device 100 is connected to, for example, an external power supply 20.

Figure 2:
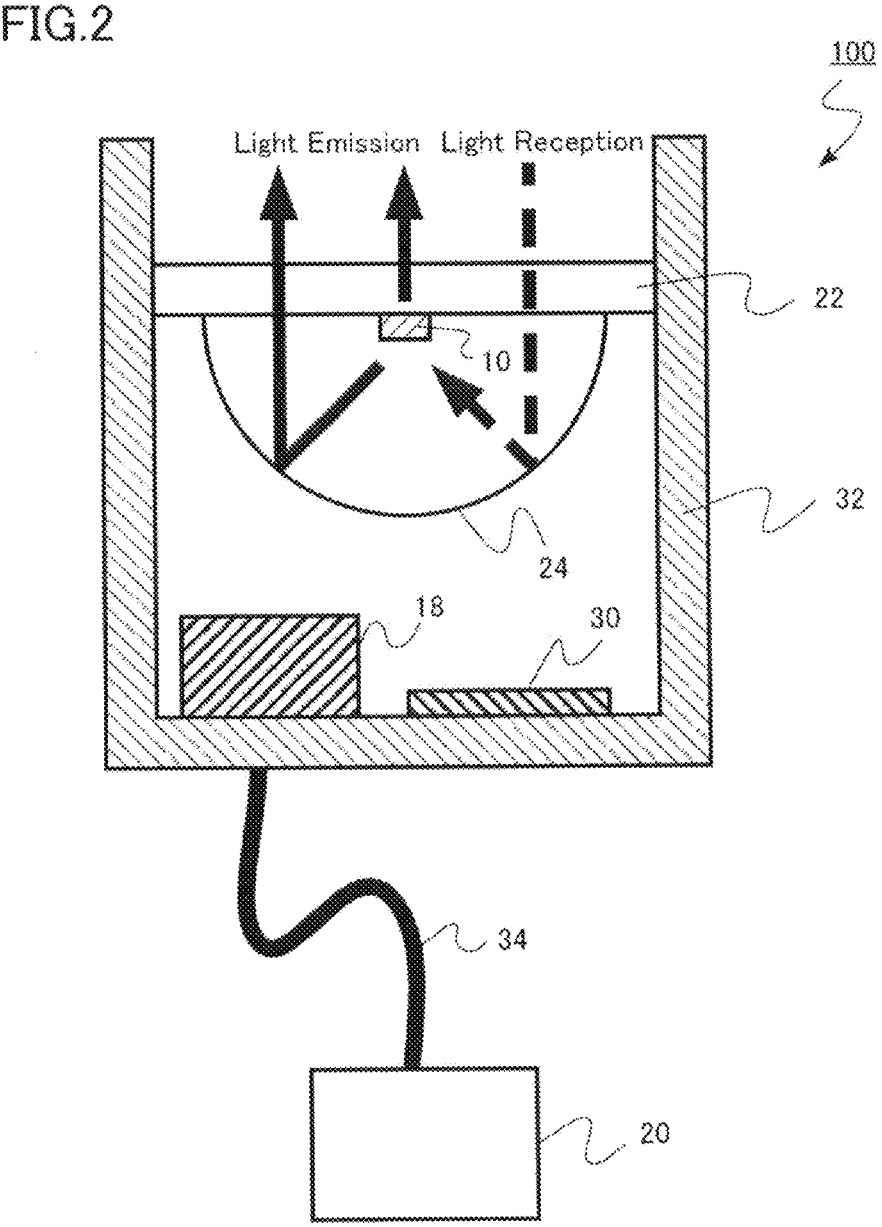
FIG. 2 is a schematic cross sectional view of the light-emitting electric-power generation device according to the first embodiment.

FIG. 2 is a schematic cross sectional view of the light-emitting electric-power generation device according to the present embodiment. The photoelectric conversion element 10 is implemented on, for example, a transparent substrate 22 at least a portion of which is transparent. A reflection surface 24 is formed at the side opposite to the transparent substrate 22 of the photoelectric conversion element 10.

The light-emitting electric-power generation device 100 includes a circuit substrate 30 and a storage battery 18. The light-emission controller 12, the electric-power generation controller 14, and the switching unit 16 are formed on, for example, the circuit substrate 30. The storage battery 18 stores electric power converted by the photoelectric conversion element 10.

Further, for example, a casing 32 for protecting the photoelectric conversion element 10, the transparent substrate 22, the reflection surface 24, the circuit substrate 30, the storage battery 18, and the like is provided. The light-emitting electric-power generation device 100 is connected to, for example, the external power supply 20 with an electric source line 34 outside of the casing 32.

Figure 3:
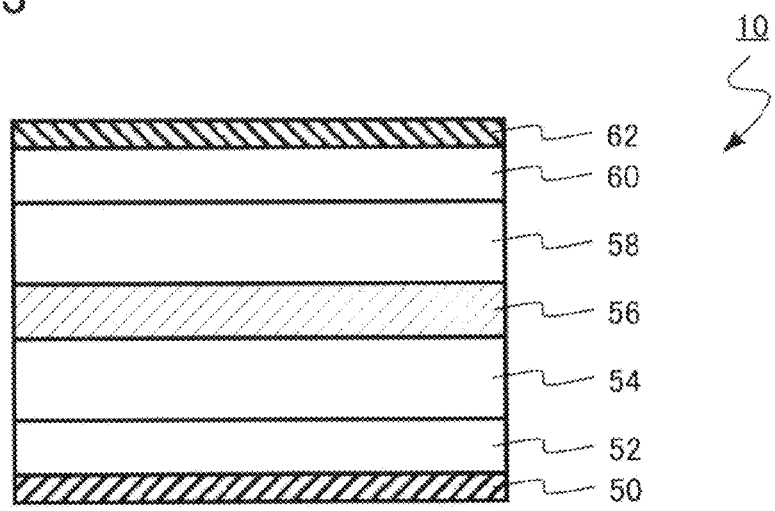
FIG. 3 is a schematic cross sectional view of an example of a photoelectric conversion element according to the first embodiment.

The photoelectric conversion element 10 is, for example, a semiconductor element having a light-emitting diode structure. FIG. 3 is a schematic cross sectional view of an example of a photoelectric conversion element according to the present embodiment.

The photoelectric conversion element 10 is, for example, an InAlGaN semiconductor element having a light-emitting diode structure.

The photoelectric conversion element 10 has a p-side electrode 50. The p-side electrode 50 is a terminal for inputting or outputting an electric current during photoelectric conversion. The p-side electrode 50 is, for example, a metal electrode, and a laminated structure including Ni (nickel)/Au (gold), which are arranged from the side of the semiconductor layer, may be employed.

The photoelectric conversion element 10 includes a $p^+$-type GaN layer 52 formed on a p-side electrode 50. On the $p^+$-type GaN layer 52, a $p^-$-type GaN layer 54 is formed. The $p^+$-type GaN layer 52 and the $p^-$-type GaN layer 54 includes, for example, Mg (magnesium) as p-type impurity.

The p-type impurity concentration of the $p^-$-type GaN layer 54 is, for example, $1\times10^{18}$ atoms/cm$^3$ to $1\times0^{19}$ atoms/cm$^3$. The p-type impurity concentration of the $p^+$-type GaN layer 52 is, for example, $2\times10^{19}$ atoms/cm$^3$ to $1\times10^{20}$ atoms/cm$^3$.

On the $p^-$-type GaN layer 54, for example, a photoelectric conversion layer 56 having a composition represented by $In_xGa_yAl_zN$ ($0<x<1$, $0<y<1$, $0 z\leq 1$, $x+y+z\leq 1$) is formed. In the photoelectric conversion layer 56, electric energy is converted into light energy, or light energy is converted into electric energy.

On the photoelectric conversion layer 56, an $n^-$-type GaN layer 58 is formed, and on the $n^-$-type GaN layer 58, an $n^+$-type GaN layer 60 is formed. The $n^+$-type GaN layer 60 and the $n^-$-type GaN layer 58 include, for example, Si (silicon) as n-type impurity.

The n-type impurity concentration of the $n^+$-type GaN layer 60 is, for example, $2\times10^{19}$ atoms/cm$^3$ to $1\times10^{20}$ atoms/cm$^3$. The n-type impurity concentration of the $n^-$-type GaN layer 58 is, for example, $1\times10^{18}$ atoms/cm$^3$ to $1\times0^{19}$ atoms/cm$^3$.

On the $n^+$-type GaN layer 60, an n-side electrode 62 is formed. The n-side electrode 62 is a terminal for inputting or outputting an electric current during photoelectric conversion. The n-side electrode 62 is, for example, a transparent electrode for transmitting light. For example, a transparent ITO (tin-doped indium oxide) electrode may be used.

The photoelectric conversion element 10 may have, for example, a structure such that a reflection layer for reflecting light generated by light emission is provided at any one of the side of the p-side electrode 50 and the side of the n-side electrode 62.

Alternatively, the photoelectric conversion element 10 may have a structure such that photoelectric conversion layer having multiple different band gaps is provided. In this structure, wavelength region of emitted light and wavelength region of received and absorbed light can be expanded.

In this explanation, the p-side electrode 50 and the n-side electrode 62 are provided on different surfaces of the photoelectric conversion element 10, for example. However, the p-side electrode 50 and the n-side electrode 62 may be in such element structure that the p-side electrode 50 and the n-side electrode 62 are provided on the same side with respect to the photoelectric conversion element 10. When they are provided on the same side, there is an advantage in that it is easy to implement them onto the substrate.

It should be noted that as the material of the photoelectric conversion element 10 having the light-emitting diode, an InAlGaN semiconductor element is preferable because it can support wide band gap and increases the degree of flexibility of the design. However, it is also possible to use InGaN, GaP, GaAs materials and the like.

From the perspective of improving the electric-power generation efficiency, the band gap of the photoelectric conversion layer 56 of the photoelectric conversion element 10 is preferably equal to or more than 0.3 eV and equal to or less than 4.0 eV corresponding to the solar energy.

The photoelectric conversion element 10 is not necessarily limited to the semiconductor element having the light-emitting diode structure. As long as the element can achieve the light-emitting function and the electric-power generation function by using the same element, it may be elements such as, for example, an organic light-emitting diode (OLED) and a semiconductor laser.

The light-emission controller 12 has a function of controlling light emission of the photoelectric conversion element 10. For example, the light-emission controller 12 performs control so that the electric power for light emission is provided from the storage battery 18 or the external power supply 20 when the illumination device is turned on at night.

On the other hand, the electric-power generation controller 14 has a function of controlling electric-power generation of the photoelectric conversion element 10. For example, the electric-power generation controller 14 performs control so that electric power converted from solar light and generated is charged to the storage battery 18 when the illumination device is turned off in daytime. For example, MPPT (Maximum Power Point Tracker) is performed to maximize the output electric power generated.

The switching unit 16 has a function of switching the light-emission state and the electric-power generation state. More specifically, it is provided with a function of switching the control of the light-emitting electric-power generation device 100 to control with the light-emission controller 12 during light emission and control with the electric-power generation controller 14 during electric-power generation. For example, when it is an outdoor illumination device, timing of switching is automatically determined based on the time period or the ambient brightness, and the light-emission state and the electric-power generation state are switched. The switching may be done based on determination made by a person.

As illustrated in FIG. 2, the photoelectric conversion element 10 is implemented on the transparent substrate 22 at least a portion of which is transparent. The transparent substrate 22 is, for example, glass substrate. For example, the n-side electrode 62 of the photoelectric conversion element 10 is implemented to face the transparent substrate 22.

A wiring layer (not shown) is formed on the transparent substrate 22. The wiring layer is preferably formed with a transparent material transmitting light, and for example, ITO ((tin-doped indium oxide) can be applied.

For example, the n-side electrode 62 is connected to the wiring layer on the transparent substrate 22 via a bump. For example, the p-side electrode 50 is connected to the wiring layer on the transparent substrate 22 with a bonding wire.

For example, on the transparent substrate, a wiring configured to control light-emission and a wiring configured to control electric-power generation are separately provided. For example, the p-side electrode 50 is connected to each of the wiring configured to control light-emission and the wiring configured to control electric-power generation. For example, the n-side electrode 62 is connected to each of the wiring configured to control light-emission and the wiring configured to control electric-power generation.

The wiring configured to control light-emission is connected to the light-emission controller 12, and the wiring configured to control electric-power generation is connected to the electric-power generation controller 14.

The photoelectric conversion element 10 is implemented on the transparent substrate 22, and therefore, when the photoelectric conversion element 10 is in the light-emission state, emitted light (solid line arrow in FIG. 2) can be transmitted through the transparent substrate 22 and can be emitted. As described above, for example, when for example, a silver (Ag) reflection layer is provided in the photoelectric conversion element 10 of the side of the p-side electrode 50 at the side opposite to the transparent substrate 22, i.e., between, for example, the p-side electrode 50 and the p$^+$-type GaN layer 52, the light emitted more efficiently can be emitted.

The reflection surface 24 is provided away from the photoelectric conversion element 10 at the side opposite to the transparent substrate 22 of the photoelectric conversion element 10. The reflection surface 24 reflects light emitted by the photoelectric conversion element 10 (solid line arrow in FIG. 2), and condenses received light (broken line arrow in FIG. 2) onto the photoelectric conversion element 10 efficiently. The reflection surface 24 is provided, so that even when the size of the photoelectric conversion element 10 functioning as the light reception element during electric-power generation is small, the electric-power generation can be done efficiently.

The reflection surface 24 is, for example, in a complete hemispheric shape. The reflection surface 24 is a hemispheric mirror. Preferably the diameter of the reflection surface 24 has a diameter twice or more the diameter of the photoelectric conversion element 10 in order to improve the light condensing efficiency and improve the electric-power generation efficiency during electric-power generation.

For example, when the diameter of the photoelectric conversion element 10 (or the length of one side) is 1 mm, and the diameter of the reflection surface 24 is 10 cm, the light condensing efficiency during electric-power generation is about 10000 times as compared with the case where the reflection surface 24 is not provided.

When the photoelectric conversion element 10 is in the light-emission state, electric current is injected from the p-side electrode 50 and the n-side electrode 62 via the wiring configured to control light-emission. Accordingly, the photoelectric conversion element 10 is driven as a light-emitting diode. Further, for example, blue light-emission can be obtained. At this occasion, most of the light emitted from the photoelectric conversion element 10 to the transparent substrate 22 passes through the transparent substrate 22, and propagates in a desired emission direction of the illumination device.

On the other hand, the light emitted from the photoelectric conversion element 10 to the reflection surface 24 is reflected by the reflection surface 24, and thereafter, it passes through the transparent substrate 22, and likewise, the light propagates in a desired emission direction of the illumination device. Generally, this principle is the same as methods configured to control the light distribution with headlights and flashlights. With the curvature radius and the size of the reflection surface 24, the emitted light can be controlled to be emitted in a desired light distribution direction (emission angle).

When the photoelectric conversion element 10 is switched to the electric-power generation state, the injection of the electric current is stopped, and the photoelectric conversion element 10 is in the stopped state or waiting state as the light-emitting diode. When the photoelectric conversion element 10 receives light having energy larger than the band gap of the photoelectric conversion layer 56 of the photoelectric conversion element 10, for example, light having a wavelength equal to or less than blue color, then the photoelectric conversion element 10 absorbs the light and generates carriers, i.e., generates power. At this occasion, with the wiring configured to control electric-power generation connected to the photoelectric conversion element 10, this generated electric power is collected, whereby the storage battery 18 can be charged.

In the electric-power generation state, the reflection surface 24 efficiently condenses the received light (broken line arrow in FIG. 2) to the photoelectric conversion element 10, which improves the electric-power generation efficiency.

The reflection surface 24 is in a hemispheric shape provided around the photoelectric conversion element 10, but the reflection surface 24 may not be necessarily in the hemispheric shape. In accordance with the purpose of the light-emitting electric-power generation device, it may be in a shape of pyramid such as quadrangular pyramid and hexagonal pyramid, or may be in other shapes such as shapes similar to a hemisphere.

As described above, according to the present embodiment, renewable energy is used to generate electric power efficiently by itself, and therefore, the light-emitting electric-power generation device consuming less electric power relying on the external power supply can be provided.

In this case, the spotlight-type outdoor illumination device has been explained as an example, but the configuration of the present embodiment can also be applied to an indoor illumination device. For example, at daytime, the light can be turned off, and electric power can be generated from natural light.

Alternatively, when only some of multiple indoor illumination devices are turned on in order to save power, the illumination devices in the OFF state receive light from the illumination devices in the ON state to generate electric-power. In this case, for example, when the illumination devices have the same structure, the energy of the emitted light and the band gap energy of the active layer of the photoelectric conversion element receiving the light are the same, and therefore, extremely high electric-power generation efficiency can be achieved.

(Second Embodiment)

A light-emitting electric-power generation device according to the present embodiment includes a first photoelectric conversion element for emitting light and generating electric power, a second photoelectric conversion element for emitting light and generating electric power, a third photoelectric conversion element for emitting light and generating electric power, a light-emission controller configured to control light emission of the first, second, and third photoelectric conversion elements, an electric-power generation controller configured to control electric-power generation of the first, second, and third photoelectric conversion elements, a switching unit configured to switch light-emission state and electric-power generation state of the first, second, and third photoelectric conversion elements, and a casing for protecting the first, second, and third photoelectric conversion elements, the light-emission controller, the electric-power generation controller, and the switching unit. Further, the switching unit has a function for switching, when any one of the first, second, and third photoelectric conversion elements is in a light-emission state, any one of the other two of them into an electric-power generation state.

The light-emitting electric-power generation device according to the present embodiment includes multiple photoelectric conversion elements, and, for example, when a certain photoelectric conversion element emits light, the other photoelectric conversion element not emitting light generates power. Electric power is generated using an element in a non-light-emitting state, so that the light-emitting electric-power generation device consuming less electric power relying on the external power supply can be provided.

The light-emitting electric-power generation device according to the present embodiment is, for example, a traffic light emitting light in red, blue, and yellow. Hereinafter, a traffic light will be explained as an example. Some of the same contents as the first embodiment will be omitted.

Figure 4A:
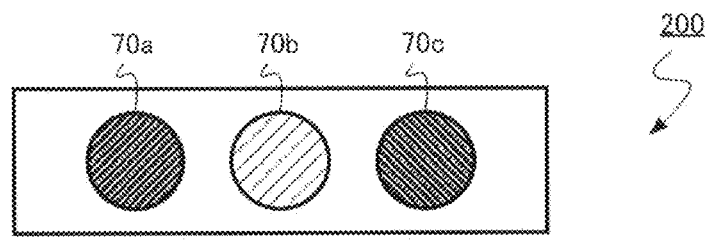
FIGS. 4A to 4C are schematic views illustrating a light-emitting electric-power generation device according to a second embodiment.
Figure 4B:
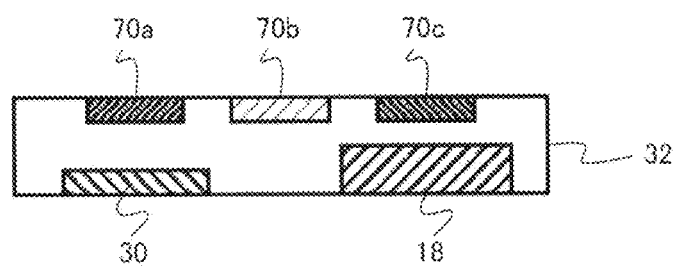
Figure 4C:
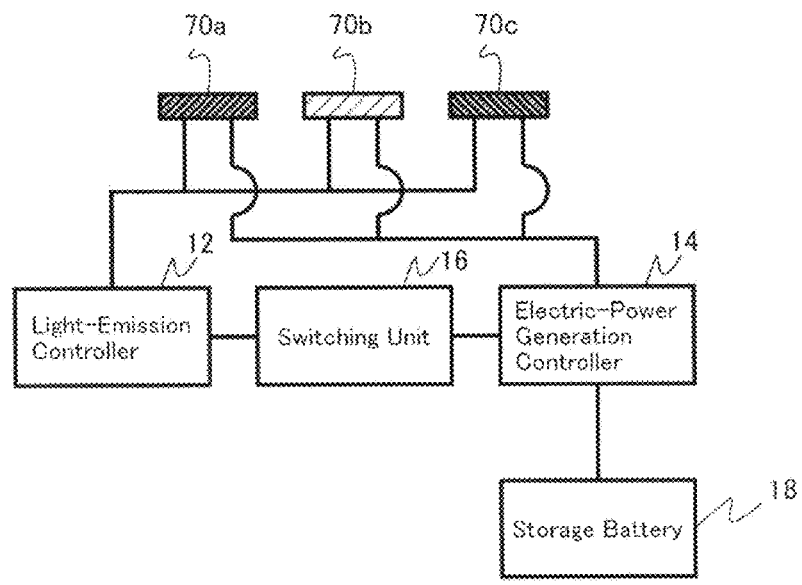

FIGS. 4A to 4C are schematic views illustrating a light-emitting electric-power generation device according to the present embodiment. FIG. 4A is an external view. FIG. 4B is a schematic cross sectional view. FIG. 4C is a block diagram.

As illustrated in FIG. 4A, a light-emitting electric-power generation device 200 is a traffic light having a red color unit 70a, a yellow color unit 70b, and a blue color unit 70c. For example, the red color unit 70a is constituted by a first photoelectric conversion element emitting multiple red color lights, the yellow color unit 70b is constituted by a second photoelectric conversion element emitting multiple yellow color lights, and the blue color unit 70c is constituted by a third photoelectric conversion element emitting multiple blue color lights.

As illustrated in FIG. 4B, the light-emitting electric-power generation device 200 includes not only the red color unit 70a, the yellow color unit 70b, and the blue color unit 70c, but also a circuit substrate 30 and a storage battery 18. Further, for example, a metal casing 32 for protecting the red color unit 70a, the yellow color unit 70b, the blue color unit 70c, the circuit substrate 30, and the storage battery 18 is provided.

Further as illustrated in FIG. 4C, the light-emitting electric-power generation device 200 includes a light-emission controller 12, an electric-power generation controller 14, and a switching unit 16. The light-emission controller 12, the electric-power generation controller 14, and the switching unit 16 are formed on, for example, the circuit substrate 30.

The first, second, and third photoelectric conversion elements are photoelectric conversion elements having the same light-emitting diode structure as the first embodiment, for example. For example, like the first embodiment, the reflection layer and the like may not be provided.

The light-emission controller 12 has a function for controlling light-emission of the first, second, and third photoelectric conversion elements. On the other hand, the electric-power generation controller 14 has a function of controlling electric-power generation of the first, second, and third photoelectric conversion elements.

When any one of the first, second, and third photoelectric conversion elements is in a light-emission state, the switching unit 16 has a function for switching any one of the other two of them or both of them into an electric-power generation state. For example, when the traffic signal is red, the switching unit 16 performs control so that the first photoelectric conversion element of the red color unit 70a is made into the light-emission state, and the second photoelectric conversion element of the yellow color unit 70b and the third photoelectric conversion element of the blue color unit 70c are made into the electric-power generation state.

As described above, the light-emitting electric-power generation device according to the present embodiment generates electric power using a photoelectric conversion element in a color not emitting light as a signal. Therefore, the light-emitting electric-power generation device consuming less electric power can be provided.

In this example, a traffic light of three colors, i.e., blue, yellow, and red, has been explained as an example, but it may be a traffic light of other colors. The colors are not limited to three colors. For example, a traffic light of two colors, i.e., red and blue, may be possible. Further, the same configuration as the present embodiment can be applied to not only the traffic light but also a light-emitting electric-power generation device emitting multiple colors.

(Third Embodiment)

The light-emitting electric-power generation device according to the present embodiment includes an image display unit such as a liquid crystal display as a light-emitting electric-power generation module. Some of the same contents as the first or second embodiment will be omitted.

In the light-emitting electric-power generation device according to the present embodiment, the photoelectric conversion element generates electric power while the device is not used. Therefore, the light-emitting electric-power generation device consuming less electric power relying on the external power supply can be provided.

The light-emitting electric-power generation device according to the present embodiment is, for example, a portable terminal having a liquid crystal display. For example, it is a cellular phone, an electronic book, a smartphone, or a tablet terminal. Hereinafter, a portable terminal having a liquid crystal display will be explained as an example.

Figure 5A:
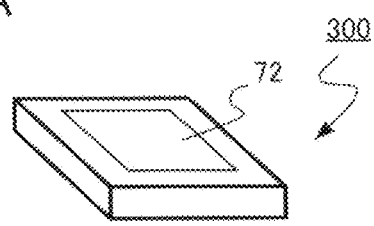
FIGS. 5A to 5C are schematic views illustrating a light-emitting electric-power generation device according to a third embodiment.
Figure 5B:
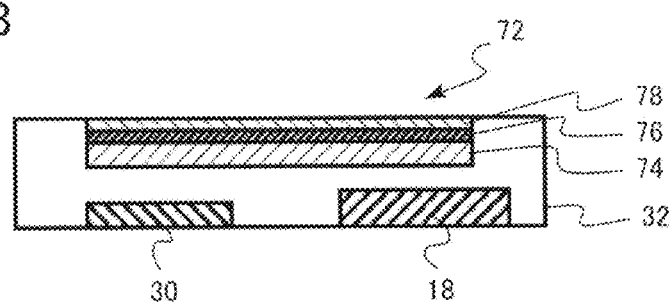
Figure 5C:
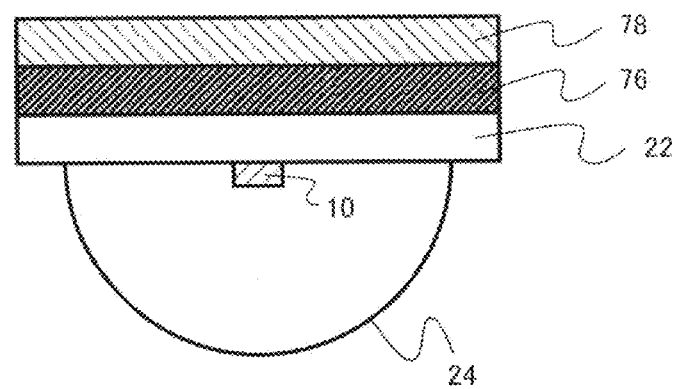

FIGS. 5A-5C are schematic views illustrating a light-emitting electric-power generation device according to the present embodiment. FIG. 5A is an external view. FIG. 5B is a schematic cross sectional view. FIG. 5C is an enlarged cross sectional view of an essential portion.

As illustrated in FIG. 5A, a light-emitting electric-power generation device 300 is a portable terminal having a liquid crystal display 72.

As illustrated in FIG. 5B, the light-emitting electric-power generation device 300 includes not only the liquid crystal display 72 but also a circuit substrate 30 and a storage battery 18. In addition, for example, a metal or resin casing 32 for protecting the liquid crystal display 72, the circuit substrate 30, and the storage battery 18 is provided.

Further, the liquid crystal display 72 includes a photoelectric conversion layer 74, a liquid crystal layer 76 on the photoelectric conversion layer 74, and a color filter layer 78 on the liquid crystal layer 76. In the photoelectric conversion layer 74, for example, multiple photoelectric conversion elements are arranged in matrix rows.

The photoelectric conversion element of the photoelectric conversion layer 74 includes, for example, a photoelectric conversion element having a light-emitting diode structure emitting blue color light. Further, the photoelectric conversion layer element includes, for example, a fluorescent layer including yellow color fluorescent material, thus emitting white color light.

In this case, yellow color fluorescent material is used, but fluorescent materials of other color gamuts such as green color and red color may be separately used or in combination. In such case, reproduced color gamut of the display is improved. The light-emitting diode structure emitting blue color light is used as the photoelectric conversion element, but photoelectric conversion elements of other color gamuts such as green color and red color may be used or may be used in combination. In this case, likewise, fluorescent materials of various wavelength regions may be used. By optimizing the design, reproduced color gamut of the display is improved.

The color filter layer 78 has, for example, different color depending on the photoelectric conversion layer element. For example, it is anyone of blue color, green color, red color. The liquid crystal layer 76 controls transmission and shielding of the light emitted from the photoelectric conversion element and the light incident upon the photoelectric conversion element.

As illustrated in FIG. 5C, for example, like what is shown in the first embodiment, the photoelectric conversion element 10 of the photoelectric conversion layer 74 is implemented on the transparent substrate 22 at least a portion of which is transparent. The transparent substrate 22 is, for example, glass substrate. In this case, on the transparent substrate 22, a liquid crystal layer 76 is formed. Further, a reflection surface 24 is formed at the side opposite to the transparent substrate 22 of the photoelectric conversion element 10.

FIG. 6 is a block diagram illustrating the light-emitting electric-power generation device according to the present embodiment. The light-emitting electric-power generation device 300 includes a light-emitting electric-power generation module 302. The light-emitting electric-power generation module 302 is, for example, a liquid crystal display panel.

The light-emitting electric-power generation module 302 includes a liquid crystal layer 76, a photoelectric conversion element 10, a light-emission controller 12, an electric-power generation controller 14, and a switching unit 16. The light-emitting electric-power generation device 300 includes a storage battery 18. Further, the light-emitting electric-power generation device 300 is connected to, for example, an external power supply 20. The light-emission controller 12, the electric-power generation controller 14, and the switching unit 16 are formed on, for example, the circuit substrate 30.

The light-emission controller 12 has a function of controlling light emission of the photoelectric conversion element 10. The light-emission controller 12 controls the liquid crystal layer 76 so that, for example, a desired image is displayed on the liquid crystal display 72, and controls transmission and shielding of the light emitted from the photoelectric conversion element 10. For example, control is performed so that electric power for light emission is provided from the storage battery 18 or the external power supply 20.

On the other hand, the electric-power generation controller 14 has a function of controlling electric-power generation of the photoelectric conversion element 10. For example, when the portable terminal is not used, i.e., when no image is displayed on the liquid crystal display 72, the electric-power generation controller 14 performs control so that electric power generated by the photoelectric conversion element 10 is charged to the storage battery 18. For example, MPPT (Maximum Power Point Tracker) is performed to maximize the output electric power generated.

During electric-power generation, the light from the outside needs to be retrieved into the photoelectric conversion element 10. For this reason, the electric-power generation controller 14 controls the liquid crystal layer 76 so that, for example, it passes the light from the outside during the electric-power generation.

The switching unit 16 has a function of switching the light-emission state and the electric-power generation state. More specifically, it is provided with a function of switching the control of the light-emitting electric-power generation device 300 to control with the light-emission controller 12 during light emission and control with the electric-power generation controller 14 during electric-power generation. For example, when the portable terminal is used, the state is switched from the light-emission state into the electric-power generation state. For example, switching may be in synchronization with ON/OFF of power supply of the portable terminal.

It should be noted that as long as the light incident into the light-emitting electric-power generation device 300 from the outside includes light of a wavelength corresponding to the band gap of the photoelectric conversion element 10, the type thereof is not limited, and solar light or indoor light may be sufficient. However, when the photoelectric conversion element 10 has light-emitting diode structure, and the external light is illumination light emitted from the light-emitting diode, then if the band gaps of them both are close, there is little unwanted light component, and therefore, light-electric power conversion efficiency is improved. More specifically, for example, when the liquid crystal display having light-emitting diodes as light source is used indoors where light-emitting diode illuminations are used, the present embodiment is particularly effective.

The light-emitting electric-power generation device according to the present embodiment can, for example, charge the battery using solar light or illumination light when the device is not used. Therefore, the light-emitting electric-power generation device consuming less electric power can be provided. Therefore, for example, this can reduce the frequency of charging from the external power supply of the portable terminal, and the highly portable portable terminal can be provided.

In this explanation, in the liquid crystal display 72, each pixel separately includes the photoelectric conversion element 10. For example, the present embodiment can also be applied to a display of a format (local dimming-type) in which the display may be divided into multiple sections, and the photoelectric conversion element is provided and controlled in each section. In this case, the control can be simplified.

The present embodiment can also be applied to a liquid crystal display of a mode (edge light-type) in which a photoelectric conversion element serving as light source is provided at a display end portion, and using a guiding light plate, light is guided to the liquid crystal layer 76 and the color filter layer 78. In this case, since the light source is provided at an end portion, the thickness of the display can be reduced.

In this explanation, the display of the portable terminal has been explained, for example. But the present embodiment can also be applied to a larger device such as a liquid crystal display of a personal computer, a liquid crystal television, and the like.

(Fourth Embodiment)

A light-emitting electric-power generation device according to the present embodiment includes a first photoelectric conversion element for emitting light and generating electric power, a second photoelectric conversion element for emitting light and generating electric power, a third photoelectric conversion element for emitting light and generating electric power, a light-emission controller configured to control light emission of the first, second, and third photoelectric conversion elements, an electric-power generation controller configured to control electric-power generation of the first, second, and third photoelectric conversion elements, a switching unit configured to switch light-emission state and electric-power generation state of the first, second, and third photoelectric conversion elements, and a casing for protecting the first, second, and third photoelectric conversion elements, the light-emission controller, the electric-power generation controller, and the switching unit. The first photoelectric conversion element emits blue color light of which peak wavelength is equal to or more than 380 nm and equal to or less than 500 nm, the second photoelectric conversion element emits green color light of which peak wavelength is equal to or more than 500 nm and equal to or less than 570 nm, and the third photoelectric conversion element emits red color light of which peak wavelength is equal to or more than 570 nm and equal to or less than 720 nm. Some of the same contents as the first to third embodiments will be omitted.

In the light-emitting electric-power generation device according to the present embodiment, the photoelectric conversion element generates electric power while the device is not used. Therefore, the light-emitting electric-power generation device consuming less electric power relying on the external power supply can be provided.

The light-emitting electric-power generation device according to the present embodiment is, for example, a television set using a display in which the three primary color of RGB light is provided in one pixel. Hereinafter, such television set will be explained as an example.

Figure 7A:
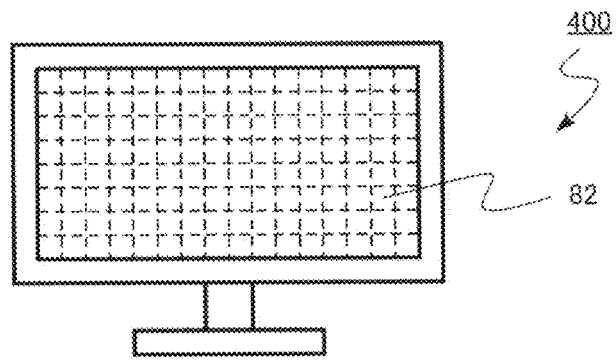
FIGS. 7A to 7C are schematic views illustrating a light-emitting electric-power generation device according to a fourth embodiment.
Figure 7B:
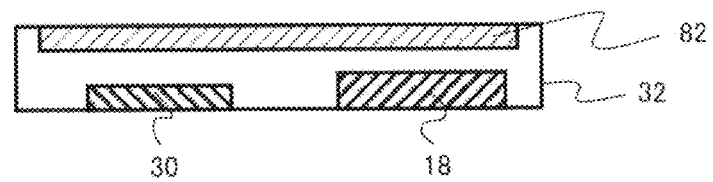
Figure 7C:
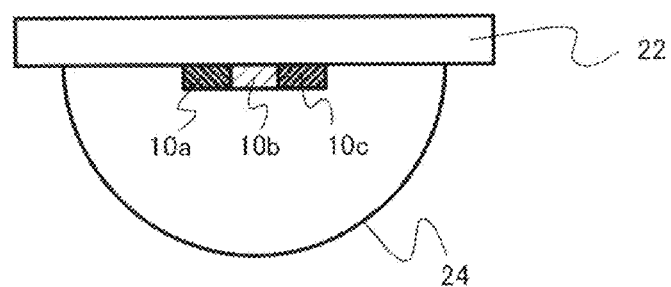

FIGS. 7A to 7C are schematic views illustrating a light-emitting electric-power generation device according to the present embodiment. FIG. 7A is an external view. FIG. 7B is a schematic cross sectional view. FIG. 7C is an enlarged cross sectional view of an essential portion.

As illustrated in FIG. 7A, the light-emitting electric-power generation device 400 is a television set having a display 82 having light-emitting diodes. In the display 82, a region enclosed by a broken line rectangle represents a pixel of a display. The size of a pixel is, for example, 100 μm☐ (square) to 1 mm☐ (square).

As illustrated in FIG. 7B, the light-emitting electric-power generation device 400 includes not only the display 82 but also a circuit substrate 30 and a storage battery 18. In addition, for example, a metal or resin casing 32 for protecting the display 82, the circuit substrate 30, and the storage battery 18 is provided.

As illustrated in FIG. 7C, in each pixel, a first photoelectric conversion element 10a, a second photoelectric conversion element 10b, and a third photoelectric conversion element 10c are implemented adjacent to each other, on the transparent substrate 22 at least a portion of which is transparent. The first photoelectric conversion element 10a emits blue color light of which peak wavelength is equal to or more than 380 nm and equal to or less than 500 nm, the second photoelectric conversion element 10b emits green color light of which peak wavelength is equal to or more than 500 nm and equal to or less than 570 nm, and the third photoelectric conversion element 10c emits red color light of which peak wavelength is equal to or more than 570 nm and equal to or less than 720 nm.

The sizes of the first, second, and third photoelectric conversion elements 10a, 10b, 10c are determined in relation to the size of each pixel, and is, for example, 1 μm☐ (square) to 100 μm☐ (square).

The transparent substrate 22 is, for example, glass substrate. Further, a reflection surface 24 is formed at the side opposite to the transparent substrate 22 of the first, second, and third photoelectric conversion elements 10a, 10b, 10c. In FIG. 7C, the shape of the reflection surface 24 is in a hemispheric shape, but in order to make the arrangement of pixels easy, shapes of pyramid such as quadrangular pyramid and hexagonal pyramid may be employed.

In the present embodiment, the first, second and third photoelectric conversion elements 10a, 10b, 10c constituting one pixel is away from the photoelectric conversion element of an adjacent pixel with the reflection surface 24. Therefore, lights from the pixels are not mixed. Therefore, an image of high resolution and high contrast can be achieved.

Figure 8:
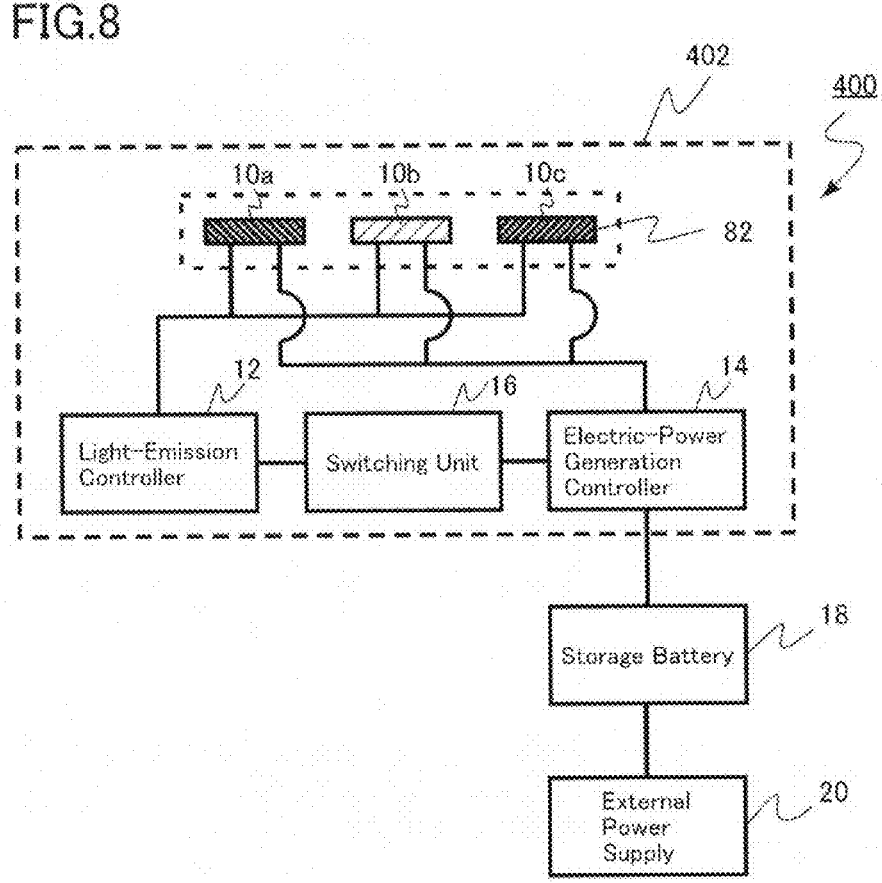
FIG. 8 is a block diagram illustrating a light-emitting electric-power generation device according to the fourth embodiment.

FIG. 8 is a block diagram illustrating a light-emitting electric-power generation device according to the present embodiment. The light-emitting electric-power generation device 400 includes a light-emitting electric-power generation module 402. The light-emitting electric-power generation module 402 is, for example, a display panel.

The light-emitting electric-power generation module 402 includes first, second and third photoelectric conversion elements 10a, 10b, 10c, a light-emission controller 12, an electric-power generation controller 14, and a switching unit 16. The light-emitting electric-power generation device 400 includes a storage battery 18. Further, the light-emitting electric-power generation device 400 is connected to, for example, an external power supply 20. The light-emission controller 12, the electric-power generation controller 14, and the switching unit 16 are formed on, for example, the circuit substrate 30.

The light-emission controller 12 has a function for controlling light-emission of the first, second and third photoelectric conversion elements 10a, 10b, 10c. The light-emission controller 12 performs control so that, for example, a desired image is displayed on the display 82. For example, control is performed so that electric power for light emission is provided from the storage battery 18 or the external power supply 20.

On the other hand, the electric-power generation controller 14 has a function of controlling electric-power generation of the first, second, and third photoelectric conversion elements 10a, 10b, 10c. For example, when the television set is not used, i.e., when no image is displayed on the display 82, the electric-power generation controller 14 performs control so that electric power generated by the photoelectric conversion element 10 is charged to the storage battery 18. For example, MPPT (Maximum Power Point Tracker) is performed to maximize the output electric power generated.

The switching unit 16 has a function of switching the light-emission state and the electric-power generation state. More specifically, it is provided with a function of switching the control of the light-emitting electric-power generation device 400 to control with the light-emission controller 12 during light emission and control with the electric-power generation controller 14 during electric-power generation. For example, when the television set is not used, the state is switched from the light-emission state into the electric-power generation state. For example, switching may be in synchronization with ON/OFF of power supply of the television set.

It should be noted that as long as the light incident into the light-emitting electric-power generation device 400 from the outside includes light of a wavelength corresponding to the band gap of the first, second, and third photoelectric conversion elements 10a, 10b, 10c, the type thereof is not limited, and solar light or indoor light may be sufficient. However, when the first, second, and third photoelectric conversion elements 10a, 10b, 10c have light-emitting diode structure, and the external light is illumination light emitted from the light-emitting diode, then if the band gaps of them both are close, there is little unwanted light component, and therefore, light-electric power conversion efficiency is improved. More specifically, for example, when the display having light-emitting diodes as light source is used indoors where light-emitting diode illuminations are used, the present embodiment is particularly effective.

The light-emitting electric-power generation device according to the present embodiment can, for example, charge the battery using solar light or illumination light when the device is not used. Therefore, the light-emitting electric-power generation device consuming less electric power can be provided.

Preferably, the switching unit 16 has a function for, when any one of the first, second, and third photoelectric conversion elements is in a light-emission state, switching any one of the other two of them or both of them into an electric-power generation state. For example, when a certain pixel is displaying blue, the switching unit 16 commands and controls the light-emission controller 12 and the electric-power generation controller 14 so that the first photoelectric conversion element 10a in blue color is made into the light-emission state, and the second photoelectric conversion element 10b in green color and the third photoelectric conversion element 10c in red color are made into the electric-power generation state.

When the switching unit 16 performs such control, the battery can be charged even when the television set is used. Therefore, the light-emitting electric-power generation device consuming less electric power can be provided.

In the explanation, in the display 82, each pixel has the photoelectric conversion element emitting three colors, i.e., RGB, for example, but, for example, the colors are not limited to RGB, and a photoelectric conversion element emitting other colors may be provided. The number of colors is not limited to three and may be two or four or more.

In this explanation, the display of the television set has been explained, for example. But the present embodiment can also be applied to, for example, a display of a personal computer, a display of a portable terminal, and the like.

The light-emitting electric-power generation device according to the present embodiment can, for example, charge the battery using solar light or illumination light when the device is not used. Therefore, the light-emitting electric-power generation device consuming less electric power can be provided.

While certain embodiments have been described, these embodiments have been presented by way of example only, and are not intended to limit the scope of the inventions. Indeed, light-emitting electric-power generation module, light-emitting electric-power generation device described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. A light-emitting electric-power generation module comprising:
    a photoelectric conversion element including a photoelectric conversion layer, the photoelectric conversion layer emitting light and generating electric power;
    a light-emission controller which controls the photoelectric conversion layer of the photoelectric conversion element to operate in a light emission state in which light is emitted;
    an electric-power generation controller which controls the photoelectric conversion layer of the photoelectric conversion element to operate in an electric-power generation state in which electric power is generated; and
    a switching unit which switches control of the photoelectric conversion layer of the photoelectric conversion element to be controlled by either the light-emission controller or the electric-power generation controller to obtain operation of the photoelectric conversion layer in either the light-emission state or the electric-power generation state.

2. The module according to claim 1 further comprising:
    a transparent substrate on which the photoelectric conversion element is implemented; and
    a reflection surface provided at a side opposite to the transparent substrate of the photoelectric conversion element, wherein a space exists between the reflection surface and the photoelectric conversion element, the reflection surface reflects light emitted by the photoelectric conversion element, and the reflection surface condenses light received by the module onto the photoelectric conversion element.

3. The module according to claim 2, wherein the reflection surface is in a hemispheric shape.

4. The module according to claim 1, wherein the photoelectric conversion element has a light-emitting diode structure.

5. The module according to claim 1, wherein a band gap of the photoelectric conversion layer of the photoelectric conversion element is in a range equal to or more than 0.3 eV and equal to or less than 4.0 eV.

6. A light-emitting electric-power generation module comprising:
    a first photoelectric conversion element including a first photoelectric conversion layer, the first photoelectric conversion layer emitting light and generating electric power;
    a second photoelectric conversion element including a second photoelectric conversion layer, the second photoelectric conversion layer emitting light and generating electric power;
    a light-emission controller which controls the first and second photoelectric conversion layers of the first and second photoelectric conversion elements to operate in a light emission state in which light is emitted;
    an electric-power generation controller which controls the first and second photoelectric conversion layers of the first and second photoelectric conversion elements to operate in an electric-power generation state in which electric power is generated; and
    a switching unit which switches control of the first and second photoelectric conversion layers of the first and second photoelectric conversion elements to be controlled by either the light-emission controller or the electric-power generation controller to obtain operation of the first and second photoelectric conversion layers in either the light-emission state or the electric-power generation state.

7. The module according to claim 6 further comprising:
    a transparent substrate on which the first and second photoelectric conversion elements are implemented adjacent to each other; and a reflection surface provided at a side opposite to the transparent substrate of the first and second photoelectric conversion elements, wherein a space exists between the reflection surface and the first and second photoelectric conversion elements, the reflection surface reflects light emitted by the first and second photoelectric conversion elements, and the reflection surface condenses light received by the module onto the first and second photoelectric conversion elements.

8. The module according to claim 6 further comprising a third photoelectric conversion element emitting light and generating electric power,
wherein the first photoelectric conversion element emits blue color light of which peak wavelength is equal to or more than 380 nm and equal to or less than 500 nm,
the second photoelectric conversion element emits green color light of which peak wavelength is equal to or more than 500 nm and equal to or less than 570 nm, and
the third photoelectric conversion element emits red color light of which peak wavelength is equal to or more than 570 nm and equal to or less than 720 nm.

9. The module according to claim 6, wherein at least one of the first and second photoelectric conversion elements has a light-emitting diode structure.

10. A light-emitting electric-power generation module comprising:
a first photoelectric conversion element emitting light and generating electric power;
a second photoelectric conversion element emitting light and generating electric power;
a light-emission controller controls light emission of the first and second photoelectric conversion elements;
an electric-power generation controller controls electric-power generation of the first and second photoelectric conversion elements; and
a switching unit switches light-emission state and electric-power generation state of the first and second photoelectric conversion elements,
wherein the switching unit switches the second photoelectric conversion element into an electric-power generation state when the first photoelectric conversion element is in a light-emission state.

11. A light-emitting electric-power generation device comprising:
a photoelectric conversion element including a photoelectric conversion layer, the photoelectric conversion layer emitting light and generating electric power;
a light-emission controller which controls the photoelectric conversion layer of the photoelectric conversion element to operate in a light emission state in which light is emitted;
an electric-power generation controller which controls the photoelectric conversion layer of the photoelectric conversion element to operate in an electric-power generation state in which electric power is generated;
a switching unit which switches control of the photoelectric conversion layer of the photoelectric conversion element to be controlled by either the light-emission controller or the electric-power generation controller to obtain operation of the photoelectric conversion layer in either the light-emission state or the electric-power generation state; and
a casing protecting the photoelectric conversion element, the light-emission controller, the electric-power generation controller, and the switching unit.

12. The device according to claim 11 further comprising a storage battery storing electric power converted by the photoelectric conversion element.

13. The device according to claim 11 further comprising:
a transparent substrate on which the photoelectric conversion element is implemented; and
a reflection surface provided at a side opposite to the transparent substrate of the photoelectric conversion element, wherein a space exists between the reflection surface and the photoelectric conversion element, the reflection surface reflects light emitted by the photoelectric conversion element, and the reflection surface condenses light received by the device onto the photoelectric conversion element.

14. The device according to claim 11, wherein the photoelectric conversion element has a light-emitting diode structure.

15. The device according to claim 11, wherein a band gap of the photoelectric conversion layer of the photoelectric conversion element is in a range equal to or more than 0.3 eV and equal to or less than 4.0 eV.

16. A light-emitting electric-power generation device comprising:
a first photoelectric conversion element including a first photoelectric conversion layer, the first photoelectric conversion layer emitting light and generating electric power;
a second photoelectric conversion element including a second photoelectric conversion layer, the second photoelectric conversion layer emitting light and generating electric power;
a light-emission controller which controls the first and second photoelectric conversion layers of the first and second photoelectric conversion elements to operate in a light emission state in which light is emitted;
an electric-power generation controller which controls the first and second photoelectric conversion layers of the first and second photoelectric conversion elements to operate in an electric-power generation state in which electric power is generated; and
a switching unit which switches control of the first and second photoelectric conversion layers of the first and second photoelectric conversion elements to be controlled by either the light-emission controller or the electric-power generation controller to obtain operation of the first and second photoelectric conversion layers in either the light-emission state or the electric-power generation state; and
a casing protecting the first and second photoelectric conversion elements, the light-emission controller, the electric-power generation controller, and the switching unit.

17. The device according to claim 16 further comprising a storage battery storing electric power converted by the first and second photoelectric conversion elements.

18. The device according to claim 16 further comprising:
a transparent substrate on which the first and second photoelectric conversion elements are implemented adjacent to each other; and
a reflection surface provided at a side opposite to the transparent substrate of the first and second photoelectric conversion elements, wherein a space exists between the reflection surface and the first and second photoelectric conversion elements, the reflection surface reflects light emitted by the first and second photoelectric conversion elements, and the reflection surface condenses light received by the device onto the first and second photoelectric conversion elements.

19. The device according to claim 16 further comprising a third photoelectric conversion element for emitting light and generating electric power,
wherein the first photoelectric conversion element emits blue color light of which peak wavelength is equal to or more than 380 nm and equal to or less than 500 nm, the second photoelectric conversion element emits green color light of which peak wavelength is equal to or more than 500 nm and equal to or less than 570 nm, and the third photoelectric conversion element emits red color light of which peak wavelength is equal to or more than 570 nm and equal to or less than 720 nm.

20. A light-emitting electric-power generation device comprising:
a first photoelectric conversion element emitting light and generating electric power;
a second photoelectric conversion element emitting light and generating electric power;
a light-emission controller which controls light emission of the first and second photoelectric conversion elements;
an electric-power generation controller which controls electric-power generation of the first and second photoelectric conversion elements;
a switching unit which switches light-emission state and electric-power generation state of the first and second photoelectric conversion elements; and
a casing protecting the first and second photoelectric conversion elements, the light-emission controller, the electric-power generation controller, and the switching unit,
wherein the switching unit switches the second photoelectric conversion element into an electric-power generation state when the first photoelectric conversion element is in a light-emission state.

* * * * *